US012725744B2

(12) United States Patent
Shi et al.

(10) Patent No.: US 12,725,744 B2
(45) Date of Patent: Sep. 1, 2026

(54) OPERATION APPARATUS FOR ROTARY SWITCH AND ROTARY SWITCH

(71) Applicants: Huawei Digital Power Technologies Co., Ltd., Shenzhen (CN); Shanghai Liangxin Electrical Co., Ltd., Shanghai (CN)

(72) Inventors: Jian Shi, Shanghai (CN); Chen Song, Shanghai (CN); Yang Chang, Shanghai (CN)

(73) Assignees: Huawei Digital Power Technologies Co., Ltd., Shenzhen (CN); Shanghai Liangxin Electrical Co., Ltd., Shanghai (CN)

( * ) Notice: Subject to any disclaimer, the term of this patent is extended or adjusted under 35 U.S.C. 154(b) by 447 days.

(21) Appl. No.: 18/309,550

(22) Filed: Apr. 28, 2023

(65) Prior Publication Data

US 2023/0268148 A1 Aug. 24, 2023

Related U.S. Application Data

(63) Continuation of application No. PCT/CN2021/119494, filed on Sep. 22, 2021.

(30) Foreign Application Priority Data

Oct. 30, 2020 (CN) ......................... 202011198254.0

(51) Int. Cl.
*H01H 19/14* (2006.01)
*H01H 3/38* (2006.01)

(52) U.S. Cl.
CPC .............. *H01H 19/14* (2013.01); *H01H 3/38* (2013.01)

(58) Field of Classification Search
CPC ....... H01H 2009/0094; H01H 2019/00; H01H 2019/02; H01H 2019/14; H01H 2221/00; H01H 2221/008; H01H 2221/01; H01H 2221/016; H01H 2221/024; H01H 2221/028; H01H 2231/032; H01H 19/14;
(Continued)

(56) References Cited

U.S. PATENT DOCUMENTS 5,671,840 A * 9/1997 Glicksman ............... H01H 9/04 264/516
8,664,552 B2 3/2014 Knoerrchen et al.
2023/0154702 A1* 5/2023 Zhang .................... H01H 19/24 200/336

FOREIGN PATENT DOCUMENTS

CN 101128900 A 2/2008
CN 211376496 U 8/2020
(Continued)

*Primary Examiner* — Anthony R Jimenez
(74) *Attorney, Agent, or Firm* — Leydig, Voit & Mayer, Ltd.

(57) ABSTRACT

An operation apparatus for a rotary switch and a rotary switch relate to the field of switch technologies. The operation apparatus for a rotary switch includes a motion member and a fastener having an accommodating cavity. The motion member passes through the accommodating cavity, and the motion member is driven to move in the accommodating cavity and can be switched between a lock position and a working position. The lock position restricts rotation of the motion member. When the motion member is in the working position, a release can be reset under action of the motion member. The operation apparatus for the rotary switch provides for reliable reset of the release.

19 Claims, 9 Drawing Sheets

(58) Field of Classification Search
CPC .. H01H 3/00; H01H 3/08; H01H 3/02; H01H 3/04; H01H 3/32; H01H 3/38; H01H 9/20; H01H 9/22; H01H 2003/00; H01H 2003/02; H01H 2003/08; H01H 2003/10; H01H 3/10; H01H 9/223; H01H 71/10; H01H 25/06; H01H 2071/565
USPC .......................................................... 200/336
See application file for complete search history.

(56) References Cited

FOREIGN PATENT DOCUMENTS

| | | | | | |
|---|---|---|---|---|---|
| CN | 112164641 | A | | 1/2021 | |
| CN | 112216567 | A | | 1/2021 | |
| CN | 213401054 | U | | 6/2021 | |
| CN | 213401064 | U | | 6/2021 | |
| EP | 2256768 | A1 | | 12/2010 | |
| GB | 2279810 | A | * | 1/1995 | ............. H01H 71/56 |
| WO | 2019128289 | A1 | | 7/2019 | |

* cited by examiner

OPERATION APPARATUS FOR ROTARY SWITCH AND ROTARY SWITCH

CROSS-REFERENCE TO RELATED APPLICATION

This application is a continuation of International Application No. PCT/CN2021/119494, filed on Sep. 22, 2021, which claims priority to Chinese Patent Application No. 202011198254.0, filed on Oct. 30, 2020. The disclosures of the aforementioned applications are hereby incorporated by reference in their entireties.

TECHNICAL FIELD

Example embodiments of the present disclosure relate to the field of switch technologies, and in particular, to an operation apparatus for a rotary switch and a rotary switch.

BACKGROUND

The term "switch" is interpreted as on and off. A switch is a component that can open a circuit, interrupt a current, or lead a current to another circuit. A most common switch is a manual electromechanical device having one or more contacts. If the switch is turned on, the contact is connected and a current is allowed to flow through. If the switch is turned off, the contact is disconnected and a current is not allowed to flow through. The switch has developed from a manual knife switch to an intelligent switch used in various large-scale electrical control devices, presenting growing functions and improved security. A rotary switch, as a common type of switch, locks an operation apparatus for the rotary switch in a specific position that corresponds to a specific state of the rotary operation apparatus, to prevent the rotary operation apparatus from an unauthorized operation.

Technological advancements, particularly in photovoltaic systems, have required a remote switching function for the rotary switch. For example, when a fire occurs in a photovoltaic panel, a circuit needs to be disconnected through remote control. Typically, the rotary switch needs to be reset after remote switching to perform subsequent switching action. In the conventional technology, before switch-on and switch-off of a circuit breaker, a reset button of a release on the circuit breaker usually needs to be pressed to control reset of the release, so that normal switch-off of the circuit breaker is ensured. However, if a reset operation is not successfully performed or not performed at all, but the rotary switch is driven to control switch-on or switch-off of the circuit breaker, an automatic switch-on and switch-off function will fail.

SUMMARY

In an example embodiment, the present disclosure provides an operation apparatus for a rotary switch and a rotary switch, to implement reliable reset of a release.

According to one aspect of the present disclosure, an operation apparatus for a rotary switch is provided. The operation apparatus for a rotary switch includes a motion member and a fastener having an accommodating cavity. The motion member passes through the accommodating cavity, and the motion member is driven to move in the accommodating cavity and can be switched between a lock position and a working position. The lock position restricts rotation of the motion member. When the motion member is in the working position, a release can be reset under action of the motion member. The operation apparatus for a rotary switch can implement reliable reset of the release.

Optionally, the motion member includes a driving handle and an abutting member. A rotating end of the driving handle passes through the accommodating cavity. The abutting member is sleeved on the rotating end. The driving handle is driven to move along an axis of the accommodating cavity and switched between the lock position and the working position. When the driving handle is in the working position, the abutting member acts on the release.

Optionally, a guide channel is further provided on an inner wall of the accommodating cavity. The guide channel includes a first vertical groove and a first travel groove communicating with the first vertical groove. The first travel groove and the first vertical groove are provided at an included angle. A guide piece is provided on an outer wall of the driving handle, and the guide piece is fitted in the guide channel. When the guide piece is fitted in the first vertical groove, the driving handle is in the lock position. When the guide piece is fitted in the first travel groove, the driving handle is in the working position.

Optionally, the first travel groove is provided perpendicular to the first vertical groove.

Optionally, a reset groove is further provided on the inner wall of the accommodating cavity. The reset groove is provided between and communicates with the first vertical groove and the first travel groove, and is configured to reset the guide piece.

Optionally, the reset groove includes a second vertical groove and a second travel groove that communicate with each other. The second vertical groove is provided between and communicates with the first travel groove and the second travel groove. The second travel groove is provided between and communicates with the second vertical groove and the first vertical groove.

Optionally, the first travel groove is provided in parallel to the second travel groove.

Optionally, there are two guide channels symmetrically provided on the inner wall of the accommodating cavity, and there are also two guide pieces symmetrically provided on the outer wall of the driving handle.

Optionally, a first bump extending from the inner wall of the accommodating cavity towards the handle is provided on the fastener. A second bump is provided on an outer wall of the rotating end. The operation apparatus for a rotary switch further includes a spring sleeved on the rotating end. One end of the spring abuts against the first bump, and the other end abuts against the second bump.

Optionally, the driving handle further includes a handheld end connected to the rotating end.

Optionally, the abutting member includes an annular piece and a pressing rod connected to the annular piece. The annular piece is sleeved on the rotating end. A guide groove is provided on a side that is of the fastener and that is close to the abutting member. The pressing rod extends out of the fastener along the guide groove. The pressing rod is configured to act on the release.

Optionally, there are two guide grooves provided on the fastener. The pressing rod includes a first sub-rod and a second sub-rod. The first sub-rod and the second sub-rod are respectively located on two opposite sides of the annular piece. The first sub-rod and the second sub-rod are fitted in the two guide grooves respectively. The second sub-rod is configured to act on the release.

Optionally, the outer wall of the rotating end is sleeved with a sealing ring, and the sealing ring is located between the handheld end and the abutting member.

Optionally, the outer wall of the rotating end is further sleeved with a gasket, where the gasket is located on a side that is of the sealing ring and that is away from the abutting member.

Optionally, the rotating end further includes a circlip and a blocking portion. The blocking portion and the circlip are provided on two opposite sides of the annular piece respectively, to restrict an axial movement of the annular piece relative to the rotating end.

According to another aspect of the present disclosure, a rotary switch is provided. The rotary switch includes a release and the foregoing operation apparatus for a rotary switch. The operation apparatus for a rotary switch is configured to act on the release to reset the release. The rotary switch can implement reliable reset of the release.

Embodiments of the present disclosure provide an operation apparatus for a rotary switch. The operation apparatus for a rotary switch includes a motion member and a fastener having an accommodating cavity. The motion member passes through the accommodating cavity, and the motion member is driven to move in the accommodating cavity and can be switched between a lock position and a working position. The lock position restricts rotation of the motion member. When the motion member is in the working position, a release can be reset under action of the motion member. In this case, the motion member is restricted by the lock position and cannot rotate before the release is reset. When the motion member enters the working position from the lock position, the motion member acts on the release to reset the release is reset. Therefore, in this application, rotation is performed to control switch-on and switch-off of a circuit breaker after the release is reset, so that the release can be reliably reset. This avoids failure of switch-on and switch-off caused by rotation performed before the release is reset.

BRIEF DESCRIPTION OF DRAWINGS

To describe technical solutions in embodiments of the present disclosure more clearly, the following briefly describes the accompanying drawings. It should be understood that the accompanying drawings show only some example embodiments of the present disclosure, and therefore should not be considered as a limitation on the scope of the invention. A person of ordinary skill in the art may still derive other related drawings from these accompanying drawings without creative efforts.

Figure 1:
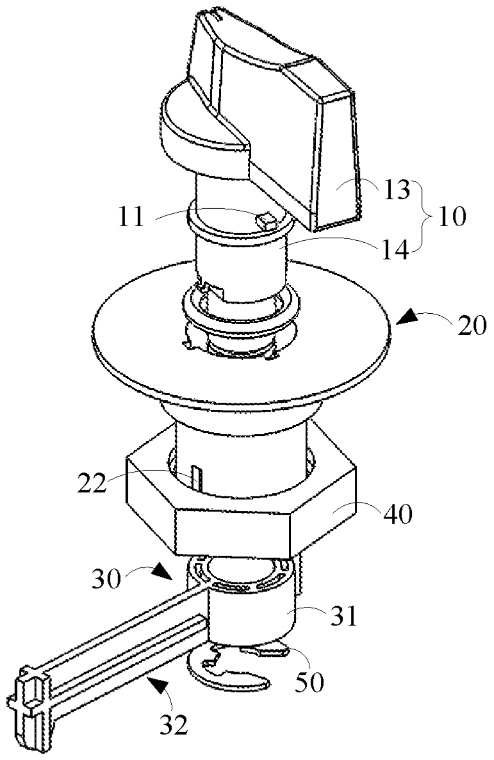
FIG. 1 is a schematic diagram 1 of a structure of an operation apparatus for a rotary switch according to an embodiment of the present disclosure.

Reference numerals: 10: driving handle; 11: guide piece; 12: fitting portion; 13: handheld end; 14: rotating end; 141: sealing ring; 142: blocking portion; 20: fastener; 21: accommodating cavity; 22: guide groove; 23: guide channel; 231: first vertical groove; 232: first travel groove; 24: reset groove; 241: second vertical groove; 242: second travel groove; 25: first bump; 30: abutting member; 31: annular piece; 32: pressing rod; 321: first sub-rod; 322: second sub-rod; 40: nut; 50: circlip; 60: release; and 61: reset button.

DESCRIPTION OF EMBODIMENTS

To make objectives, technical solutions, and advantages of embodiments of the present disclosure clearer, the following clearly describes technical solutions in embodiments of the present disclosure with reference to the accompanying drawings. It will be appreciated that the described embodiments are some but not all of embodiments of the present disclosure. Generally, components of embodiments of the present disclosure described and shown in the accompanying drawings herein may be arranged and designed in various configurations.

The following detailed descriptions of embodiments of the present disclosure provided in the accompanying drawings are not intended to limit the scope of the claims, but merely to represent example embodiments of the present disclosure. All other embodiments obtained by a person of ordinary skill in the art based on embodiments of the present disclosure without creative efforts may fall within the protection scope of the present disclosure.

It should be noted that similar reference numerals and letters indicate similar items in the following accompanying drawings, and therefore, once an item is defined in one of the accompanying drawings, no further definition or explanation is required in the following accompanying drawings.

In the description of the present disclosure, it should be noted that an orientation or position relationship indicated by terms "center", "upper", "lower", "left", "right", "vertical", "horizontal", "inner", "outer", or the like is an orientation or position relationship based on the accompanying drawings, or an orientation or position relationship that the product of the present disclosure is usually placed when in use. These terms are merely used to facilitate and simplify description of the present disclosure, instead of indicating or implying that a mentioned apparatus or element needs to have a specific orientation or be constructed and operated in a specific orientation, and therefore the terms cannot be construed as a limitation on the present disclosure. In addition, terms "first", "second", "third", and the like are merely used for differentiation and description, and cannot be understood as an indication or implication of relative importance.

In addition, terms such as "horizontal" and "vertical" do not indicate that a component is required to be absolutely horizontal or vertical, but may be slightly tilted. For example, "horizontal" only indicates that a direction is more horizontal than a "vertical" direction, and does not indicate that a structure needs to be completely horizontal, but may be slightly tilted.

In the description of the present disclosure, it should be further noted that, unless otherwise specified and limited explicitly, terms "provided", "mounted", "interconnected", and "connected" shall be interpreted broadly, and for example, may be fixedly connected, detachably connected, or integrally connected, may be mechanically connected or electrically connected, and may be directly connected, indirectly connected via an intermediate medium, or internally communicated between two elements. A person of ordinary skills in the art may understand specific meanings of the foregoing terms in the present disclosure according to a specific condition.

Figure 9:
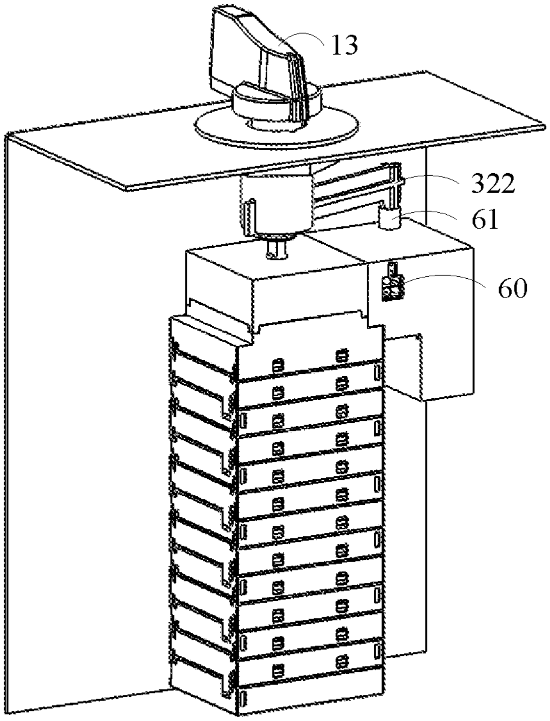
FIG. 9 is a schematic diagram of an operation apparatus for a rotary switch according to an embodiment of the present disclosure.

Refer to FIG. 1 and FIG. 9. Embodiments provide an operation apparatus for a rotary switch. The operation apparatus for a rotary switch includes a motion member and a fastener 20 having an accommodating cavity 21. The motion member passes through the accommodating cavity 21. The motion member is driven to move in the accommodating cavity 21 and can be switched between a lock position and a working position. The lock position restricts rotation of the motion member. When the motion member is in the working position, a release 60 can be reset under action of the motion member.

It should be noted that the operation apparatus for a rotary switch provided in this embodiment not only has a function of controlling an operating mechanism of a circuit breaker to act, but also has a function of resetting the release 60 before controlling the operating mechanism to act. For example, in this embodiment, a fitting portion 12 may further be provided at an end that is of the motion member and that is close to the circuit breaker, so that the operation apparatus for a rotary switch cooperates with the operating mechanism of the circuit breaker through the fitting portion 12. This implements an action of driving the circuit breaker to be switched off or switched on. It should be understood that, controlling action of the operating mechanism of the circuit breaker is a basic function of the operation apparatus for a rotary switch. The manner in which the operation apparatus for a rotary switch controls action of the operating mechanism of the circuit breaker is merely an example of this embodiment, and is not a specific limitation on the implementation. A person skilled in the art may select any feasible implementation, provided that the operation apparatus for a rotary switch can control the operating mechanism to act to control switch-on or switch-off.

In this embodiment, the motion member is driven to move in the accommodating cavity 21 and can be switched between the lock position and the working position. The lock position restricts rotation of the motion member. When the motion member is in the working position, the release 60 can be reset under action of the motion member. The lock position can restrict rotation of the motion member. When the operation apparatus for a rotary switch enters the working position from the lock position, the release 60 may be reset under action of the motion member. In this case, the motion member also unlocks a locked state. In other words, the motion member can rotate. In this embodiment, the motion member may be restricted to rotating before the release 60 is reset, and can rotate only after the motion member is in the working position and the release 60 is reset.

This embodiment provides the operation apparatus for a rotary switch. The operation apparatus for a rotary switch includes the motion member and the fastener 20 having the accommodating cavity 21. The motion member passes through the accommodating cavity 21. The motion member is driven to move in the accommodating cavity 21 and can be switched between the lock position and the working position. The lock position restricts rotation of the motion member. When the motion member is in the working position, the release 60 can be reset under action of the motion member. In this case, the motion member is restricted by the lock position and cannot rotate before the release 60 is reset. When the motion member enters the working position from the lock position, the motion member acts on the release 60 to reset the release. Therefore, in this application, rotation is performed to control switch-on and switch-off of the circuit breaker after the release 60 is reset, so that the release 60 can be reliably reset. This avoids failure of switch-on and switch-off caused by rotation performed before the release 60 is reset.

In this application, before the release 60 is reset, rotation of the motion member may be restricted to avoid failure of switch-on and switch-off caused by rotation performed before the release 60 is reset. Certainly, in another embodiment of this application, before the release 60 is reset, the motion member may be made idling to avoid failure of switch-on and switch-off caused by rotation performed before the release 60 is reset. The idling of the motion member indicates that the motion member can rotate but cannot act on the operating mechanism of the circuit breaker.

Before the release 60 is reset, there are a plurality of manners of restricting rotation of the motion member to avoid failure of switch-on and switch-off caused by rotation performed before the release 60 is reset. For example, rotation of the motion member is restricted by restricting rotation of a driving handle 10 of the motion member, by restricting rotation of an abutting member 30 of the motion member, by using a structure of the fastener, and the like.

For example, when rotation of the motion member is restricted by restricting rotation of the abutting member 30, rotation of the abutting member 30 may be restricted before the release 60 is reset. There are at least two implementations. In a first implementation, rotation is restricted by restricting rotation of an end that is of the abutting member 30 and that is close to the release 60 (for example, the end that is of the abutting member 30 and that is close to the release 60 may rotate without limitation only after the end that is of the abutting member 30 and that is close to the release 60 acts on the release 60 and reset the release 60). In a second implementation, rotation is restricted by restricting rotation of an end that is of the abutting member 30 and that is close to the driving handle 10 (for example, the end that is of the abutting member 30 and that is close to the driving handle 10 may rotate without limitation only after the release 60 is reset). A specific implementation is not limited in this application provided that a rotation action of the operation apparatus for a rotary switch can be locked before the release 60 is reset, and unlocked after the release 60 is reset. Specifically, there are various cases in which the operation apparatus for a rotary switch is stuck when driving the circuit breaker to be switched on. Details are not listed one by one in this application.

This embodiment is described below by using an example in which the driving handle 10 of the motion member is restricted to rotate before the release 60 is reset.

The motion member includes the driving handle 10 and the abutting member 30, where a rotating end of the driving handle 10 passes through the accommodating cavity 21. The abutting member 30 is sleeved on the rotating end 14 of the driving handle 10. The driving handle 10 is driven to move along an axis of the accommodating cavity 21 and can be switched between the lock position and the working position, where the lock position restricts rotation of the driving handle 10. When the driving handle 10 is in the working position, the abutting member 30 acts on the release 60 of the circuit breaker, and the driving handle 10 may rotate relative to the fastener 20 to control the circuit breaker to be switched on or off. The operation apparatus for a rotary switch can implement reliable reset of the release 60.

The driving handle 10 is configured to rotate in the accommodating cavity 21 of the fastener 20 or move along a central axis of the accommodating cavity 21. When the driving handle 10 rotates in the accommodating cavity 21 of the fastener 20, the circuit breaker may be controlled to be switched on or off. For example, the fitting portion 12 may be correspondingly provided at the rotating end 14 of the driving handle 10, so that the operation apparatus for a rotary switch cooperates with the operating mechanism of the circuit breaker through the fitting portion 12. This implements switch-on or switch-off of the circuit breaker. For example, the fitting portion 12 of the operation apparatus for a rotary switch may be a square hole. Correspondingly, the operating mechanism of the circuit breaker may be provided with a square shaft corresponding to the square hole, to implement control of the circuit breaker by the operation apparatus for a rotary switch through fitting the square shaft in the square hole. It should be understood that the square hole and the square axis are merely an example provided in this application. In another embodiment, relative positions of the square hole and the square axis may be exchanged, or may be implemented by using another fitting structure.

In addition, when the driving handle 10 moves along the central axis of the accommodating cavity 21, the driving handle 10 may control the abutting member 30 to move, so that the abutting member 30 moves relative to the fastener 20 (a movement direction herein is a direction of the axis of the accommodating cavity 21).

For example, in this embodiment, the abutting member 30 is sleeved on the rotating end 14 of the driving handle 10. Due to the sleeved relationship of the abutting member 30 and the rotating end 14, there is no radial restriction between the driving handle 10 and the abutting member 30, so that the driving handle 10 may rotate relative to the abutting member 30.

Figure 2:
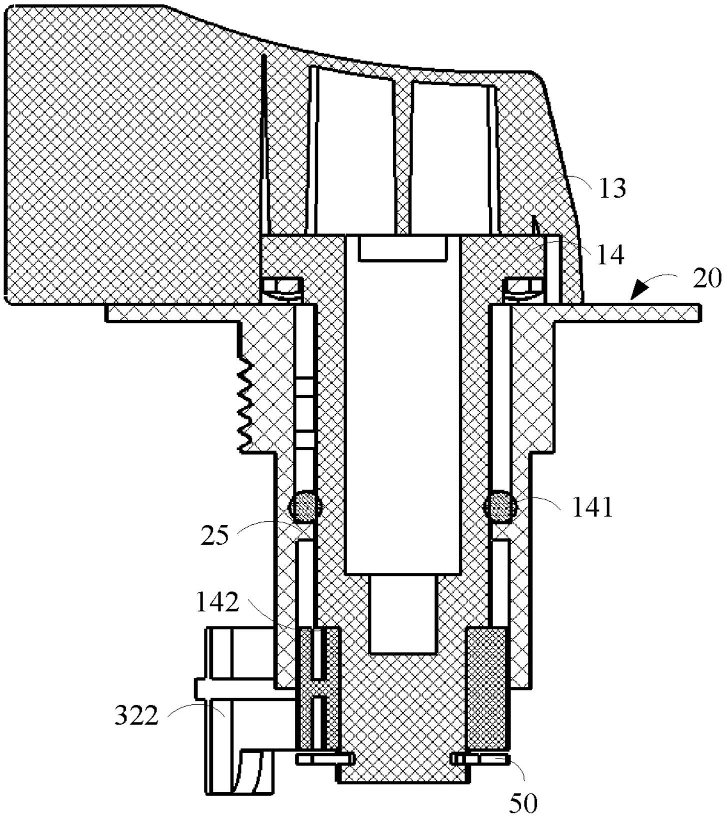
FIG. 2 is a schematic diagram 2 of a structure of an operation apparatus for a rotary switch according to an embodiment of the present disclosure.
Figure 3:
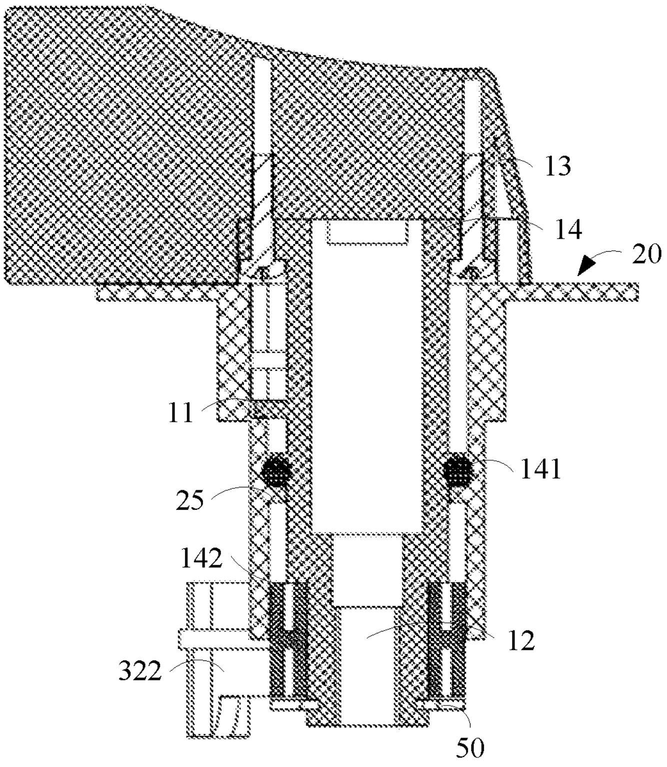
FIG. 3 is a schematic diagram 3 of a structure of an operation apparatus for a rotary switch according to an embodiment of the present disclosure.

In this embodiment, the driving handle 10 is driven to move along the axis of the accommodating cavity 21. In this case, the driving handle 10 may be switched between the lock position and the working position. When the driving handle 10 is in the lock position, the driving handle 10 is locked in a radial direction. In this case, the driving handle 10 may move in an axial direction but cannot move in a radial direction (the axial direction or the radial direction herein is mainly the direction shown in FIG. 2 or FIG. 3, which is also the case below). When the driving handle 10 moves along the axis of the accommodating cavity 21, the driving handle 10 may be switched between the lock position and the working position. When the driving handle 10 enters the working position from the lock position, the abutting member 30 may act on the release 60 of the circuit breaker, so that the abutting member 30 drives the release 60 to reset. In this case, the driving handle 10 may rotate relative to the fastener 20, to control switch-on or switch-off of the circuit breaker. In this way, in this embodiment, when the driving handle 10 is in the lock position, the driving handle 10 cannot rotate. Only after the driving handle 10 moves to the working position when the abutting member 30 acts on the release 60 of the circuit breaker and the release 60 is controlled to reset, the driving handle 10 can rotate relative to the fastener 20, so that the circuit breaker is controlled to be switched on or switched off. In this way, failure of switch-on and switch-off caused by the case that the circuit breaker is controlled to be switched on or off before the release 60 is reset can be avoided.

In a use process, the driving handle 10 may be driven to move along the axis direction of the accommodating cavity 21, so that the driving handle 10 enters the working position from the lock position. Then, the abutting member 30 acts on the release 60 of the circuit breaker when driven by the driving handle 10, and the release 60 is reset, so that the driving handle 10 can rotate relative to the fastener 20. This controls switch-on and switch-off of the circuit breaker. In this way, in this embodiment, after the operation apparatus for a rotary switch enters the working position from the lock position, the release 60 can be reset. Then the driving handle 10 rotates relative to the fastener 20, so that switch-on and switch-off of the circuit breaker is controlled. Therefore, in this application, rotation is performed to control switch-on and switch-off of the circuit breaker after the release 60 is reset, so that the release 60 can be reliably reset. This avoids failure of switch-on and switch-off caused by rotation performed before the release 60 is reset.

Figure 4:
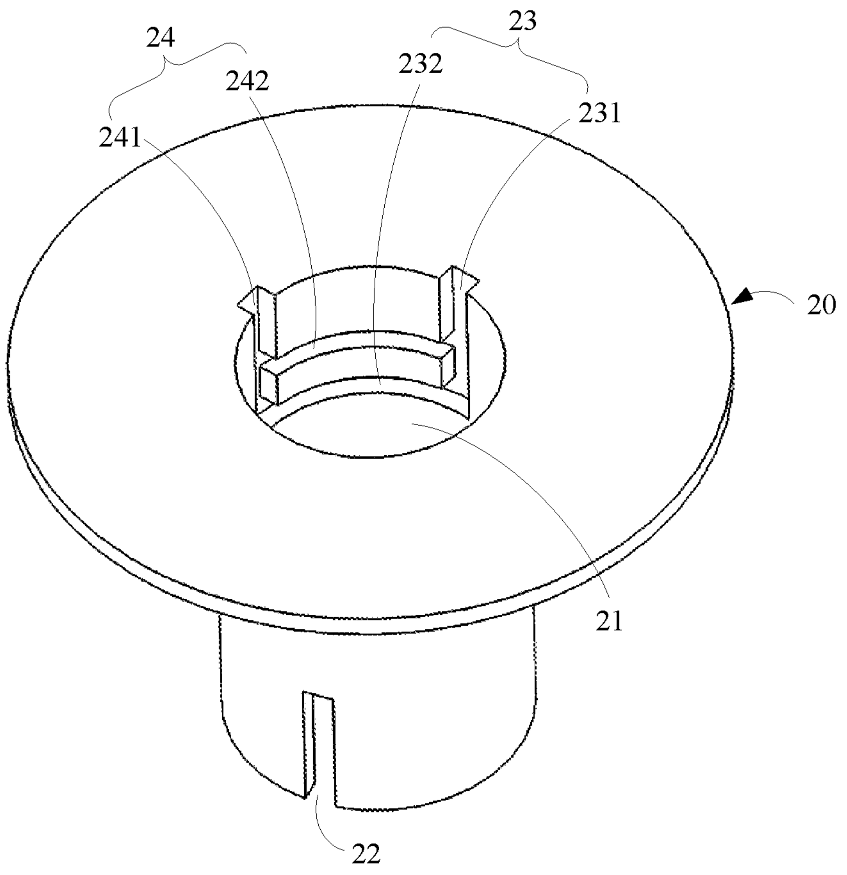
FIG. 4 is a schematic diagram 1 of a structure of a fastener according to an embodiment of the present disclosure.
Figure 5:
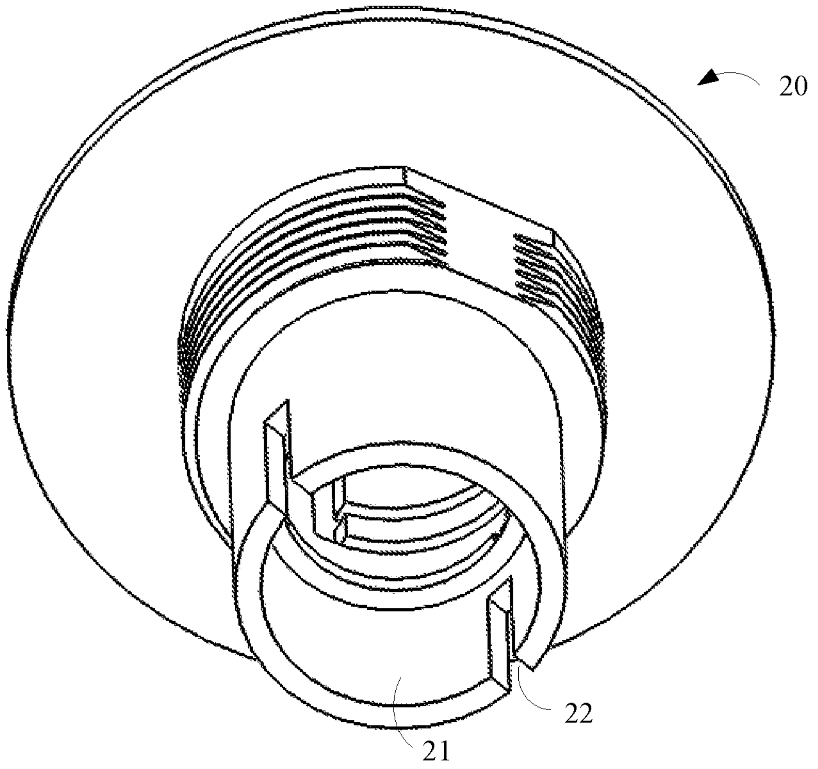
FIG. 5 is a schematic diagram 2 of a structure of a fastener according to an embodiment of the present disclosure.

Refer to FIG. 4 and FIG. 5. Optionally, a guide channel 23 is further provided on an inner wall of the accommodating cavity 21. The guide channel 23 includes a first vertical groove 231 and a first travel groove 232 communicating with the first vertical groove 231. The first travel groove 232 and the first vertical groove 231 are provided at an included angle. A guide piece 11 is provided on an outer wall of the driving handle 10, and the guide piece 11 is fitted in the guide channel 23. When the guide piece 11 is fitted in the first vertical groove 231, the driving handle 10 is in the lock position. When the guide piece 11 is fitted in the first travel groove 232, the driving handle 10 is in the working position.

In this way, when the guide piece 11 is fitted in the first vertical groove 231, the driving handle 10 is in the lock position, and in this case, the driving handle 10 cannot rotate due to existence of the guide piece 11. When the guide piece 11 is fitted in the first travel groove 232, the driving handle 10 is in the working position, and in this case, the guide piece 11 may move along the first travel groove 232, so that the driving handle 10 can rotate relative to the fastener 20. It should be noted that, in this embodiment, when the guide piece 11 moves from an end that is of the first vertical groove 231 and that is away from the first travel groove 232 to an intersection point between the first vertical groove 231 and the first travel groove 232, the driving handle 10 drives the abutting member 30, so that the abutting member 30 can act exactly on the release 60 (when the release 60 is controlled to be reset through a reset button 61, the abutting member 30 acts on the reset button 61. Other descriptions are similar to this). Specifically, a length of the first vertical groove 231 should be properly set based on an actual situation. Details are not described in this application.

It should be noted that the foregoing guide channel 23 is included in an embodiment of this application. In another embodiment, another implementation may be used to enable the driving handle 10 to be switched between the lock position and the working position, to make the driving handle 10 in the working position. In this case, the abutting member 30 acts on the release 60 of the circuit breaker, and the driving handle 10 may rotate relative to the fastener 20 to control switch-on or switch-off of the circuit breaker. For example, the guide piece 11 may be provided on the fastener 20, and the guide channel 23 may be provided on the driving handle 10. A specific manner is not limited in this application.

Optionally, the first travel groove 232 is provided perpendicular to the first vertical groove 231. In this way, movement of the driving handle 10 relative to the fastener 20 and rotation of the driving handle 10 relative to the fastener 20 do not interfere with each other, thereby facilitating operation and control.

To enable the driving handle 10 to be easily reset after rotation to avoid affecting a next operation of the rotary switch, in this embodiment, optionally, a reset groove 24 is further provided on the inner wall of the accommodating cavity 21. The reset groove 24 is provided between and communicates with the first vertical groove 231 and the first travel groove 232, and is configured to reset the guide piece 11.

For example, in an embodiment, the reset groove 24 includes a second vertical groove 241 and a second travel groove 242 that communicate with each other. The second vertical groove 241 is provided between and communicates with the first travel groove 232 and the second travel groove 242. The second travel groove 242 is provided between and communicates with the second vertical groove 241 and the first vertical groove 231. In this way, the guide piece 11 may be reset by sequentially passing through the second vertical groove 241 and the second travel groove 242, to prepare for pressing the reset button 61 next time to control the release 60 to be reset. Optionally, in this embodiment, the first travel groove 232 is provided in parallel to the second travel groove 242.

For example, in another embodiment, the reset groove 24 may alternatively be a slanting groove. One end of the slanting groove is connected to an end that is of the first travel groove 232 and that is away from the first vertical groove 231, and the other end is connected to an end that is of the first vertical groove 231 and that is away from the first travel groove 232. This also facilitates quick reset of the driving handle 10.

In addition, in this embodiment, to enable the driving handle 10 to rotate or move more stably and reliably relative to the fastener 20, in this embodiment, there may be two guide channels 23 symmetrically provided on the inner wall of the accommodating cavity 21, and there are also two guide pieces 11 symmetrically provided on the outer wall of the driving handle 10. It should be understood that each group of guide piece 11 and guide channel 23 should be adapted to each other. In a movement process, the two guide pieces 11 should move in a same direction.

Optionally, to facilitate quick reset of the driving handle 10, a first bump 25 extending from the inner wall of the accommodating cavity 21 towards the handle is provided on the fastener 20. A second bump is provided on an outer wall of the rotating end 14. The operation apparatus for a rotary switch further includes a spring sleeved on the rotating end 14. One end of the spring abuts against the first bump 25, and the other end abuts against the second bump. Herein, it should be understood that the spring should be provided without causing interference to the guide channel 23. A specific disposition location should be properly selected by a person skilled in the art according to actual arrangement of the guide channel 23 and the guide piece 11. Details are not described in this application.

Figure 6:
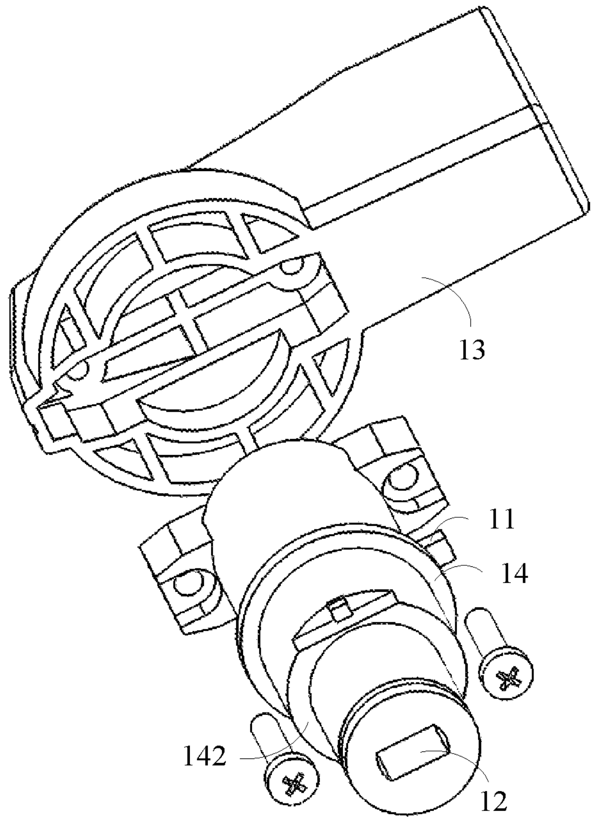
FIG. 6 is a schematic diagram of a structure of a driving handle according to an embodiment of the present disclosure.

Refer to FIG. 6. Optionally, the driving handle 10 further includes a handheld end 13 connected to the rotating end 14, where the handheld end 13 is configured to facilitate holding by a person to drive the rotating end to move. In this way, the rotating end 14 of the driving handle 10 may be easily operated and controlled in actual operation.

Figure 7:
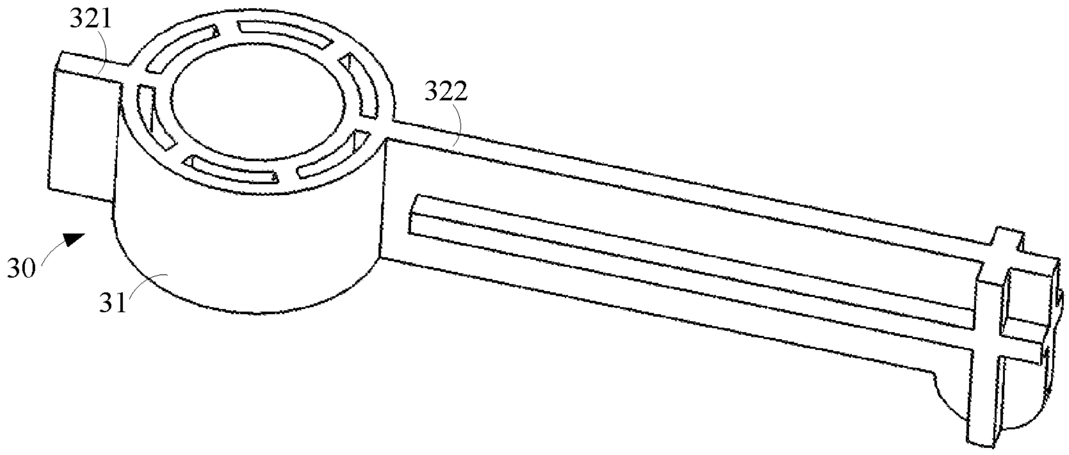
FIG. 7 is a schematic diagram of a structure of an abutting member according to an embodiment of the present disclosure.
Figure 8:
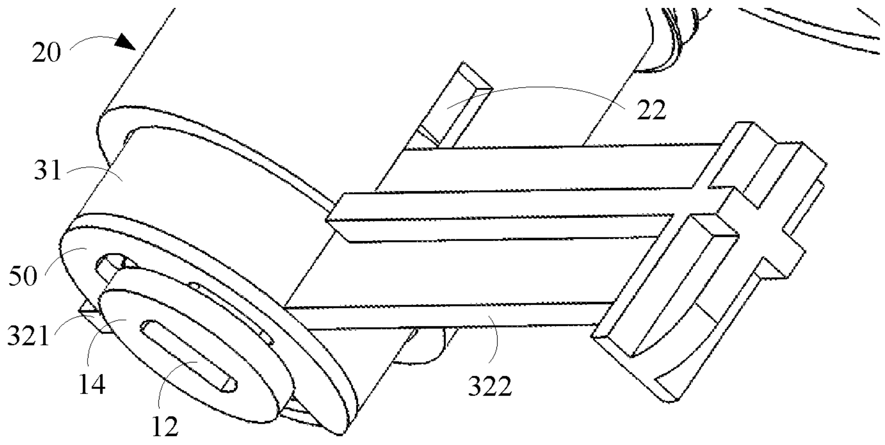
FIG. 8 is a schematic diagram of an abutting member according to an embodiment of the present disclosure.

Refer to FIG. 7 and FIG. 8. Optionally, the abutting member 30 includes an annular piece 31 and a pressing rod 32 connected to the annular piece 31. The annular piece 31 is sleeved on the rotating end 14. A guide groove 22 is provided on a side that is of the fastener 20 and that is close to the abutting member 30. The pressing rod 32 extends out of the fastener 20 along the guide groove 22. The pressing rod 32 is configured to act on the release 60. In this way, the abutting member 30 may move in the guide groove 22 via the pressing rod 32 to approach or move away from the fastener 20.

To enable the abutting member 30 to move more stably relative to the fastener 20, in this embodiment, optionally, there are two guide grooves 22 provided on the fastener 20. The pressing rod 32 includes a first sub-rod 321 and a second sub-rod 322. The first sub-rod 321 and the second sub-rod 322 are located on two opposite sides of the annular piece 31 respectively (that is, the first sub-rod 321 and the second sub-rod 322 are symmetrically provided on two sides of the annular piece 31). The first sub-rod 321 and the second sub-rod 322 are fitted in the two guide grooves 22 respectively. The second sub-rod 322 is configured to act on the release 60.

Optionally, the outer wall of the rotating end 14 is sleeved with a sealing ring 141, and the sealing ring 141 is located between the handheld end 13 and the abutting member 30. In addition, the outer wall of the rotating end 14 may be further sleeved with a gasket, and the gasket is located on a side that is of the sealing ring 141 and that is away from the abutting member 30. In this way, sealing of the operation apparatus for a rotary switch relative to a cabinet (the cabinet may be configured to fasten the operation apparatus for a rotary switch) can be easily implemented.

In addition, to facilitate fastening of the operation apparatus for a rotary switch relative to the cabinet, in this embodiment, the operation apparatus for a rotary switch may further include a nut 40. Correspondingly, a thread matching the nut 40 may be further provided on the outer wall of the fastener 20. In this way, the operation apparatus for a rotary switch may be installed on the cabinet by using the nut 40.

In this embodiment, the driving handle 10 may drive the abutting member 30 to move relative to the fastener 20, and the driving handle 10 may rotate relative to the abutting member 30. Therefore, there is an axial restriction instead of a radial restriction between the abutting member 30 and the fastener 20. Therefore, optionally, the rotating end 14 may further include a circlip 50 and a blocking portion 142. The blocking portion 142 and the circlip 50 are provided on two opposite sides of the annular piece 31 respectively, to limit an axial movement of the annular piece 31 relative to the rotating end 14 of the driving handle 10.

Figure 10:
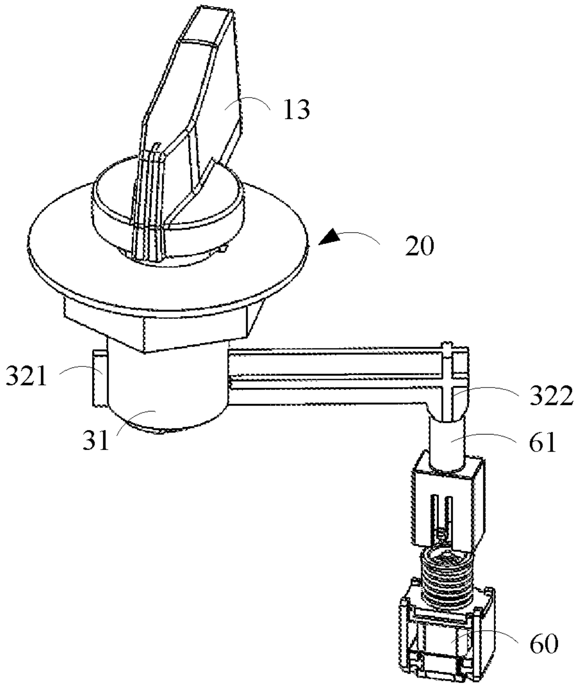
FIG. 10 is a schematic diagram of an operation apparatus for a rotary switch according to an embodiment of the present disclosure.

According to another aspect of the present disclosure, refer to FIG. 9 and FIG. 10. An embodiment further provides a rotary switch. The rotary switch includes a release 60 and the foregoing operation apparatus for a rotary switch. The operation apparatus for a rotary switch is configured to act on the release 60 to reset the release 60. The rotary switch can implement reliable reset of the release 60. Because a structure of the foregoing operation apparatus for a rotary switch and beneficial effect thereof is described in detail above, details are not described herein again.

It should be noted that the release 60 may further include a reset button 61, where the reset button 61 is configured to reset the release 60. In this way, the reset of the release 60 can be controlled in this embodiment by the operation apparatus for a rotary switch acting on the reset button 61.

The foregoing descriptions are merely example embodiments of the present disclosure, but are not intended to limit the present disclosure. For a person skilled in the art, the present disclosure may have various modifications and variations. Any modification, equivalent replacement, improvement, or the like made without departing from the principle of the present disclosure may fall within the protection scope of the present disclosure.

In addition, it should be noted that specific technical features described in the foregoing example implementations may be combined in any proper manner if there is no conflict. To avoid unnecessary repetition, possible combinations are not exhaustively described in the present disclosure.

What is claimed is:

1. An operation apparatus for a rotary switch, comprising:

a motion member; and a fastener having an accommodating cavity;

wherein the motion member passes through the accommodating cavity;

wherein the motion member is drivable to move in the accommodating cavity and is switchable between a lock position and a working position;

wherein based on the motion member being in the lock position, rotation of the motion member is restricted;

wherein based on the motion member being in the working position, a release is resettable based on action of the motion member;

wherein the motion member comprises a driving handle and an abutting member, and a rotating end of the driving handle passes through the accommodating cavity;

wherein the abutting member is sleeved on the rotating end;

wherein the driving handle is drivable to move along an axis of the accommodating cavity and switchable between the lock position and the working position;

wherein based on the driving handle being in the working position, the abutting member is configured to act on the release;

wherein a guide channel is further provided on an inner wall of the accommodating cavity, the guide channel comprising a first vertical groove and a first travel groove communicating with the first vertical groove;

wherein the first travel groove and the first vertical groove are provided at an included angle, a guide piece is provided on an outer wall of the driving handle, and the guide piece is fitted in the guide channel; and wherein the guide piece being fitted in the first vertical groove corresponds to the driving handle being in the lock position, and the guide piece being fitted in the first travel groove corresponds to the driving handle being in the working position.

2. The operation apparatus according to claim 1, wherein a first bump extending from the inner wall of the accommodating cavity towards the driving handle is provided on the fastener;

wherein a second bump is provided on an outer wall of the rotating end; and wherein the operation apparatus further comprises a spring sleeved on the rotating end, wherein one end of the spring abuts against the first bump, and another end of the spring abuts against the second bump.

3. The operation apparatus according to claim 1, wherein the first travel groove is perpendicular to the first vertical groove.

4. The operation apparatus according to claim 1, wherein a reset groove is further provided on the inner wall of the accommodating cavity, and the reset groove is provided between and communicates with the first vertical groove and the first travel groove, to reset the guide piece.

5. The operation apparatus according to claim 4, wherein the reset groove comprises a second vertical groove and a second travel groove that communicate with each other, the second vertical groove is provided between and communicates with the first travel groove and the second travel groove, and the second travel groove is provided between and communicates with the second vertical groove and the first vertical groove.

6. The operation apparatus according to claim 5, wherein the first travel groove is parallel to the second travel groove.

7. A rotary switch, comprising:

a release; and an operation apparatus for the rotary switch, wherein the operation apparatus for the rotary switch is configured to act on the release to reset the release;

wherein the operation apparatus comprises a motion member and a fastener having an accommodating cavity, wherein the motion member passes through the accommodating cavity, and wherein the motion member is drivable to move in the accommodating cavity and is switchable between a lock position and a working position;

wherein based on the motion member being in the lock position, rotation of the motion member is restricted;

wherein based on the motion member being in the working position, the release is resettable based on action of the motion member, wherein the motion member comprises a driving handle and an abutting member, wherein a rotating end of the driving handle passes through the accommodating cavity;

wherein the abutting member is sleeved on the rotating end;

wherein the driving handle is drivable to move along an axis of the accommodating cavity and switchable between the lock position and the working position;

wherein based on the driving handle being in the working position, the abutting member is configured to act on the release;

wherein a first guide channel is further provided on an inner wall of the accommodating cavity, the first guide channel comprising a first vertical groove and a first travel groove communicating with the first vertical groove;

wherein the first travel groove and the first vertical groove are provided at an included angle, a first guide piece is provided on an outer wall of the driving handle, and the first guide piece is fitted in the first guide channel; and wherein the first guide piece being fitted in the first vertical groove corresponds to the driving handle being in the lock position, and the first guide piece being fitted in the first travel groove corresponds to the driving handle being in the working position.

8. The rotary switch according to claim 7, wherein the first travel groove is perpendicular to the first vertical groove.

9. The rotary switch according to claim 7, wherein a reset groove is further provided on the inner wall of the accommodating cavity, and the reset groove is provided between and communicates with the first vertical groove and the first travel groove, to reset the first guide piece.

10. The rotary switch according to claim 9, wherein the reset groove comprises a second vertical groove and a second travel groove that communicate with each other, the second vertical groove is provided between and communicates with the first travel groove and the second travel groove, and the second travel groove is provided between and communicates with the second vertical groove and the first vertical groove.

11. The rotary switch according to claim 10, wherein the first travel groove is parallel to the second travel groove.

12. The rotary switch according to claim 7, wherein two guide channels, including the first guide channel and a second guide channel, are symmetrically provided on the inner wall of the accommodating cavity, wherein the second guide channel comprises a second vertical groove and a second travel groove communicating with the second vertical groove;

wherein two guide pieces, including the first guide piece and a second guide piece, are symmetrically provided on the outer wall of the driving handle, wherein the second guide piece is fitted in the second guide channel; and wherein the first and second guide pieces being fitted in the first and second vertical grooves corresponds to the driving handle being in the lock position, and the first and second guide pieces being fitted in the first and second travel grooves corresponds to the driving handle being in the working position.

13. The rotary switch according to claim 12, wherein a first bump extending from the inner wall of the accommodating cavity towards the driving handle is provided on the fastener;

wherein a second bump is provided on an outer wall of the rotating end; and wherein the operation apparatus further comprises a spring sleeved on the rotating end, wherein one end of the spring abuts against the first bump, and another end of the spring abuts against the second bump.

14. An operation apparatus for a rotary switch, comprising:

a motion member; and a fastener having an accommodating cavity;

wherein the motion member passes through the accommodating cavity;

wherein the motion member is drivable to move in the accommodating cavity and is switchable between a lock position and a working position;

wherein based on the motion member being in the lock position, rotation of the motion member is restricted;

wherein based on the motion member being in the working position, a release is resettable based on action of the motion member;

wherein the motion member comprises a driving handle and an abutting member, and a rotating end of the driving handle passes through the accommodating cavity;

wherein the abutting member is sleeved on the rotating end;

wherein the driving handle is drivable to move along an axis of the accommodating cavity and switchable between the lock position and the working position;

wherein based on the driving handle being in the working position, the abutting member is configured to act on the release;

wherein two guide channels, including a first guide channel and a second guide channel, are symmetrically provided on an inner wall of the accommodating cavity, and wherein the first and second guide channels respectively comprise first and second vertical grooves and first and second travel grooves communicating with the first and second vertical grooves;

wherein two guide pieces are symmetrically provided on an outer wall of the driving handle, wherein the two guide pieces comprise a first guide piece fitted in the first guide channel and a second guide piece fitted in the second guide channel; and wherein the first and second guide pieces being fitted in the first and second vertical grooves corresponds to the driving handle being in the lock position, and the first and second guide pieces being fitted in the first and second travel grooves corresponds to the driving handle being in the working position.

15. The operation apparatus according to claim 14, wherein the first travel groove is perpendicular to the first vertical groove.

16. The operation apparatus according to claim 14, wherein a first bump extending from the inner wall of the accommodating cavity towards the driving handle is provided on the fastener;

wherein a second bump is provided on an outer wall of the rotating end; and wherein the operation apparatus further comprises a spring sleeved on the rotating end, wherein one end of the spring abuts against the first bump, and another end of the spring abuts against the second bump.

17. The operation apparatus according to claim 14, wherein a reset groove is further provided on the inner wall of the accommodating cavity, and the reset groove is provided between and communicates with the first vertical groove and the first travel groove, to reset the first guide piece.

18. The operation apparatus according to claim 17, wherein the reset groove comprises the second vertical groove and the second travel groove, the second vertical groove is provided between and communicates with the first travel groove and the second travel groove, and the second travel groove is provided between and communicates with the second vertical groove and the first vertical groove.

19. The operation apparatus according to claim 18, wherein the first travel groove is parallel to the second travel groove.

* * * * *